United States Patent
Rackiewicz et al.

(10) Patent No.: US 9,629,416 B2
(45) Date of Patent: Apr. 25, 2017

(54) SLIP-ON FOOTWEAR WITH FIT FEATURES

(71) Applicant: Red Wing Shoe Company, Inc., Red Wing, MN (US)

(72) Inventors: Kyle D. Rackiewicz, Red Wing, MN (US); Mark T. Dinndorf, Edina, MN (US); David R. Swinnerton, Red Wing, MN (US); Charles L. Caverly, Red Wing, MN (US)

(73) Assignee: Red Wing Shoe Company, Inc., Red Wing, MN (US)

( * ) Notice: Subject to any disclaimer, the term of this patent is extended or adjusted under 35 U.S.C. 154(b) by 317 days.

(21) Appl. No.: 14/038,443

(22) Filed: Sep. 26, 2013

(65) Prior Publication Data

US 2014/0090275 A1    Apr. 3, 2014

Related U.S. Application Data

(63) Continuation of application No. 12/898,868, filed on Oct. 6, 2010, now abandoned.
(Continued)

(51) Int. Cl.
*A43B 23/04* (2006.01)
*A43B 23/02* (2006.01)
*A43B 1/10* (2006.01)
*A43B 3/04* (2006.01)
*A43B 11/00* (2006.01)
*A43C 1/06* (2006.01)
*B29D 35/00* (2010.01)
(Continued)

(52) U.S. Cl.
CPC .............. *A43B 23/028* (2013.01); *A43B 1/10* (2013.01); *A43B 3/04* (2013.01); *A43B 7/12* (2013.01); *A43B 11/00* (2013.01); *A43B 23/026* (2013.01); *A43B 23/027* (2013.01); *A43B 23/0235* (2013.01); *A43B 23/0255* (2013.01); *A43B 23/04* (2013.01); *A43B 23/047* (2013.01); *A43C 1/06* (2013.01); *B29D 35/0054* (2013.01); *B29D 35/0072* (2013.01); *B29D 35/126* (2013.01)

(58) Field of Classification Search
CPC .... A43B 1/10; A43B 3/04; A43B 3/02; A43B 23/02; A43B 23/04; A43B 23/045; A43B 23/047
USPC ........................................... 36/4, 45, 51, 109
See application file for complete search history.

(56) References Cited

U.S. PATENT DOCUMENTS 170,611 A    11/1875    Ward
208,897 A    10/1878    Emerson
(Continued)

FOREIGN PATENT DOCUMENTS

DE    3519440 A1    1/1986
EP    0 657 112 A1    6/1995
(Continued)

OTHER PUBLICATIONS

Invitation to Pay Additional Fees with Partial International Search mailed Mar. 2, 2011.
(Continued)

*Primary Examiner* — Marie Bays
(74) *Attorney, Agent, or Firm* — Merchant & Gould P.C.

(57) ABSTRACT

The present disclosure provides a slip-on boot with fit features that enable snug fit while still allowing for convenient foot entry and exit. Related methods of using and manufacturing a slip-on boot are also provided.

8 Claims, 16 Drawing Sheets

Related U.S. Application Data

(60) Provisional application No. 61/249,064, filed on Oct. 6, 2009, provisional application No. 61/299,256, filed on Jan. 28, 2010.

(51) Int. Cl.
  *B29D 35/12* (2010.01)
  *A43B 7/12* (2006.01)

(56) References Cited

U.S. PATENT DOCUMENTS

| | | |
|---|---|---|
| D10,959 S | 12/1878 | Kenz et al. |
| 236,323 A | 1/1881 | Graf |
| 293,064 A | 2/1884 | Packard |
| 296,495 A | 4/1884 | Williamson |
| 330,176 A | 11/1885 | Walker |
| 378,988 A | 3/1888 | Warren |
| 380,715 A | 4/1888 | Walker |
| 546,065 A | 9/1895 | Craven |
| D24,721 S | 10/1895 | Richardson et al. |
| 744,798 A | 11/1903 | Roberts |
| 970,381 A | 9/1910 | Müller |
| 1,704,688 A | 3/1929 | Valentine et al. |
| 2,297,656 A | 9/1942 | L'Hollier |
| 2,319,239 A | 5/1943 | Laird |
| 2,343,477 A | 3/1944 | Ross |
| 2,507,726 A | 5/1950 | L'Hollier et al. |
| 2,755,566 A | 7/1956 | Harrison |
| 3,146,535 A | 9/1964 | Owings |
| 3,531,878 A | 10/1970 | Corry |
| 3,645,017 A | 2/1972 | Hickmann |
| 3,744,158 A | 7/1973 | Walker |
| 3,744,161 A | 7/1973 | Herunter |
| 3,916,886 A | 11/1975 | Rogers |
| 4,016,661 A | 4/1977 | Tibbitts |
| 4,095,356 A | 6/1978 | Robran et al. |
| 4,154,009 A | 5/1979 | Kubelka et al. |
| 4,194,308 A | 3/1980 | Karlsson |
| 4,266,750 A | 5/1981 | Gallizia |
| 4,294,022 A | 10/1981 | Stockli et al. |
| 4,366,629 A | 1/1983 | Scherz |
| 4,489,509 A | 12/1984 | Libit |
| 4,649,656 A | 3/1987 | Cox et al. |
| 4,689,902 A | 9/1987 | Lewis, Jr. |
| 4,707,874 A * | 11/1987 | Champagne .............. A43B 7/12 12/142 E |
| 5,222,313 A | 6/1993 | Dowdy et al. |
| 5,481,814 A | 1/1996 | Spencer |
| 5,498,033 A | 3/1996 | Hoshizaki et al. |
| D369,016 S | 4/1996 | Parker |
| 5,813,149 A | 9/1998 | Baker et al. |
| 5,885,622 A | 3/1999 | Daley |
| 5,913,592 A | 6/1999 | Moore |
| 5,937,543 A | 8/1999 | Hall et al. |
| 5,974,698 A | 11/1999 | Nash et al. |
| 6,048,810 A * | 4/2000 | Baychar ................ A41D 27/02 36/117.3 |
| 6,189,239 B1 | 2/2001 | Gasparovic et al. |
| 6,260,288 B1 * | 7/2001 | Barthelemy ............ A43B 7/06 36/3 R |
| 6,299,817 B1 | 10/2001 | Parkinson |
| 6,438,872 B1 | 8/2002 | Chil et al. |
| 6,580,272 B2 | 6/2003 | Freed et al. |
| 6,684,533 B1 | 2/2004 | Su |
| 6,877,252 B2 | 4/2005 | Wilkinson |
| 7,325,813 B2 | 2/2008 | Bock |
| 7,980,010 B2 | 7/2011 | Davis et al. |
| 2003/0121181 A1* | 7/2003 | Chang ..................... A43B 1/00 36/45 |
| 2004/0020077 A1 | 2/2004 | Thomas et al. |
| 2004/0088890 A1 | 5/2004 | Matis et al. |
| 2005/0022429 A1* | 2/2005 | Palmer .................... A43B 7/12 36/55 |
| 2005/0229436 A1 | 10/2005 | Bock |
| 2010/0031534 A1 | 2/2010 | Davis et al. |

FOREIGN PATENT DOCUMENTS

| | | |
|---|---|---|
| WO | WO 2004/039197 A1 | 5/2004 |
| WO | WO 2010/017037 A1 | 2/2010 |

OTHER PUBLICATIONS

Bogs Footwear Co., BOGS boot, photograph, 1 page, 2009.
Muck Boot Co., MUCK Wetland boot, photograph, 1 page, 2009.
International Search Report and Written Opinion mailed May 3, 2011.

* cited by examiner

SLIP-ON FOOTWEAR WITH FIT FEATURES

CROSS REFERENCE TO RELATED APPLICATIONS

This application is a continuation of U.S. application Ser. No. 12/898,868 filed Oct. 6, 2010 (now abandoned), which claims priority to U.S. Provisional Patent Application Nos. 61/249,064 filed on Oct. 6, 2009 and 61/299,256 filed on Jan. 28, 2010, which applications are incorporated herein by reference in their entireties.

BACKGROUND

Footwear that covers a user's ankles, commonly referred to as boots, are typically either of the slip-on type or are of the type that includes mechanisms that are tightened to hold the boot securely against the foot during use and loosened to facilitate foot entry and exit from the boot.

Slip-on boots can be quicker and easier to take on and off than boots with tightening mechanisms that are loosened and tightened for foot exit and entry. However, to account for foot entry and exit from slip-on boots, the inner volume of slip-on boots is often substantially larger than the volume of the foot that the boot is intended to fit. The relative large inner volume of such boots can result in a poor fit, as the user's foot can substantially slide around in the boot during use.

SUMMARY

The present disclosure provides a slip-on boot with fit features that enable an improved fit while still allowing for convenient foot entry and exit from the boot. Related methods of using and manufacturing a slip-on boot are also provided.

DETAILED DESCRIPTION

Referring to FIGS. 1-10, embodiments of the footwear according to the present disclosure are shown. In the depicted embodiments the footwear is a slip-on boot where the foot fitting volume (the inner volume of the boot) is not as highly adjustable as compared to boots that have laces configured to be loosened to allow foot entry/exit and tightened to secure the boot onto the user's foot.

Figure 11:
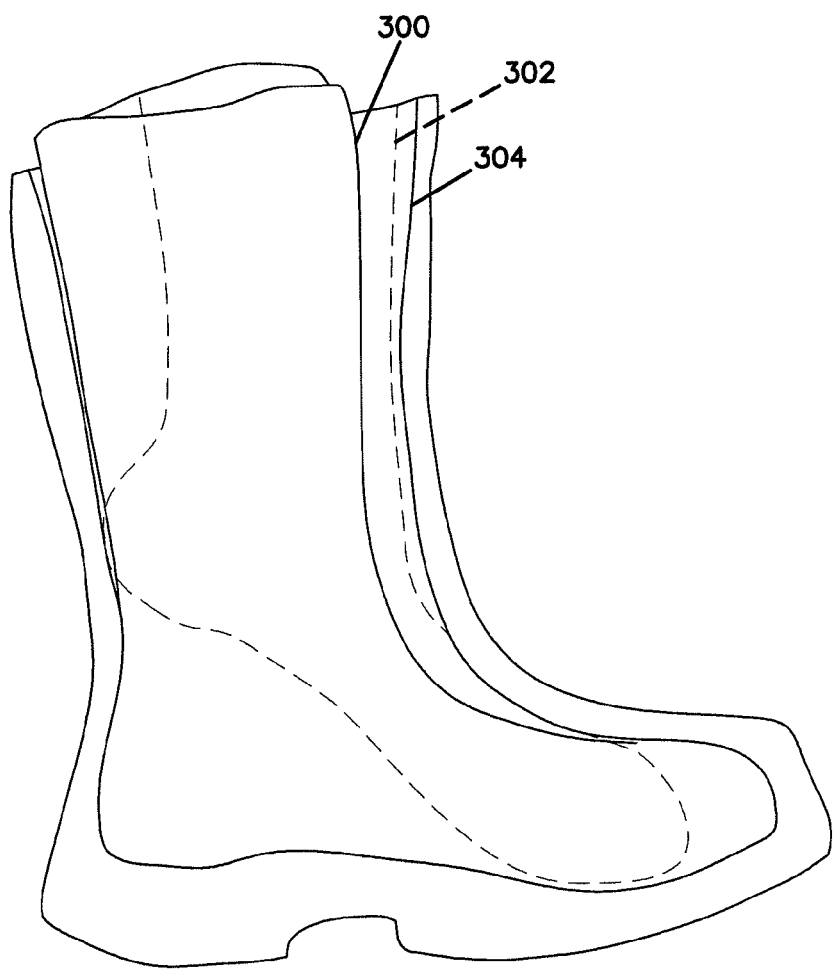
FIG. 11 is a cross-sectional view of a prior art footwear.
Figure 12:
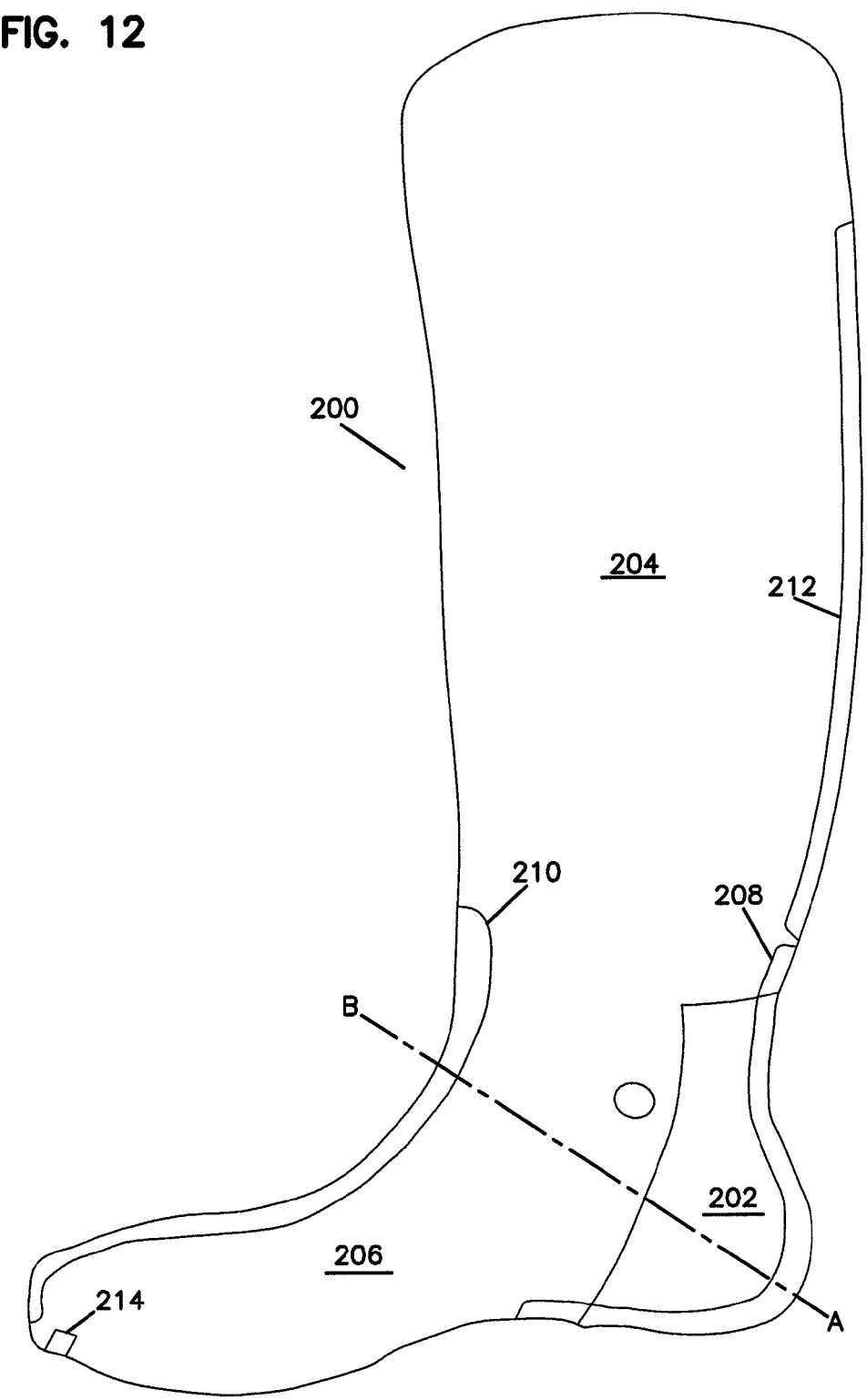
FIG. 12 is a side view of a last according to an embodiment of the present disclosure.
Figure 13:
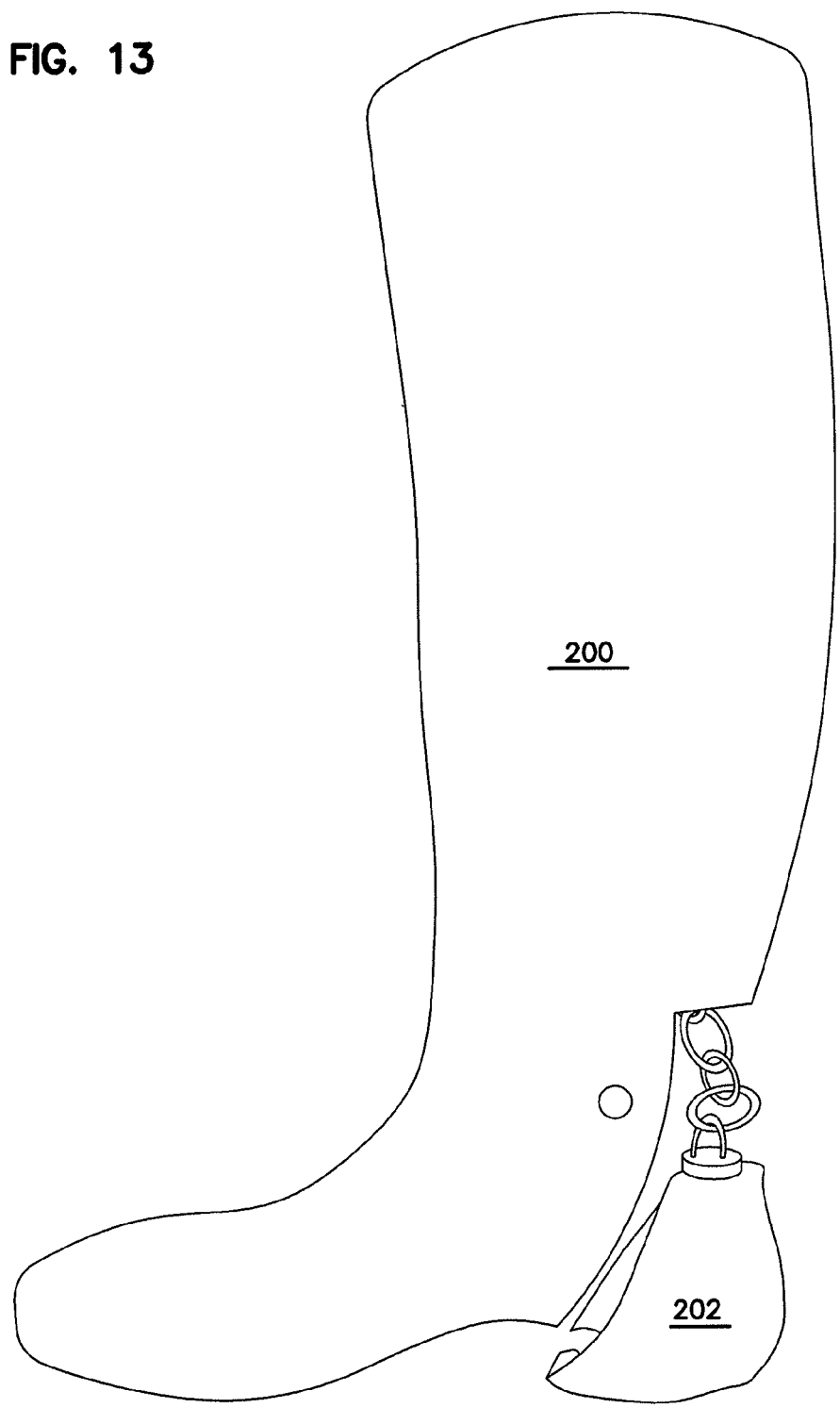
FIG. 13 is a side view of the last of FIG. 11 with the heal portion slid away from the main body portion.

In the depicted embodiment, the shape and size of the inner volume of the slip-on boot approximates the shape and size of the user's foot. The close approximation results in a fit that helps secure the user's foot in the boot 10. In some prior art slip-on boot configurations the foot fitting volume of the foot fitting portion of the boots is significantly larger than the foot that the boot is designed to fit. The large difference between the volumes is provided for clearance that is typically provided for foot entry and exit from the slip-on boot. Referring to FIG. 11, a prior art slip-on boot configuration is shown. The solid line labeled 304 represents the inner surface of the boot, the solid line labeled 300 represents the silhouette of user's foot and lower leg in a fully seated position in the boot, and the broken line labeled 302 represents the silhouette of the user foot and lower leg in an intermediate position in the boot (moving into or out of the boot). Such prior art slip-on boot configurations result in an undesirable sloppy fit (e.g., the user's foot substantially moves around within the boot during use, the user's heel sliding up and down within the boot during use).

Figure 5:
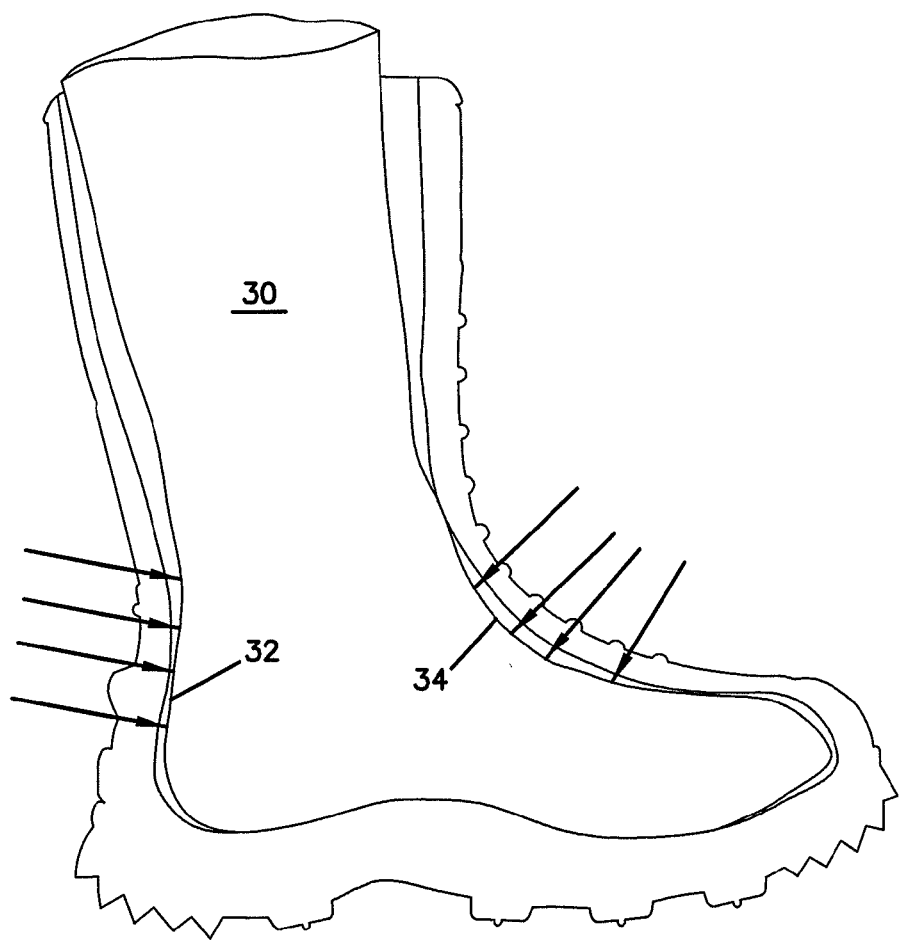
FIG. 5 is a cross-sectional view of the footwear of FIG. 1 with a foot seated in the footwear.

In the depicted embodiment, the boot 10 is configured to press against the user's foot 30 to prevent the foot from inadvertently pulling out of the boot during use. In the depicted embodiment, the boot 10 presses back against the heel and instep of the user's foot when the user raises his or her foot, thereby holding the foot 30 securely within the boot 10 as the user walks. See FIG. 5 illustrating that the boot 10 according to the depicted embodiment is configured to hold down at least the user's heel 32 and instep 34 when the user raises his or her foot, as when he or she takes a step. In the depicted embodiment, the boot 10 does not need to apply constant downward pressure on the user's foot in order for the fit feature to function. In other words, the boot 10 of the present disclosure does not need to impinge on the user's foot in order to stay secured to the user's foot. The boot of the depicted embodiment, provides for some clearance between the users foot and the boot to avoid the user's clothing (pant leg, sock, etc.) from bunching. However, it should be appreciated that in an alternative embodiment, the boot could be configured to apply constant pressure on the user's foot.

The boot 10 of the depicted embodiment of the present disclosure is configured to apply a comfortable and secure fit without actually impinging on the user's foot. The boot 10 of the depicted embodiment is configured so that the clearance between the boot and foot is relatively consistent. However, it should be appreciated that in alternative embodiments the boot may include specific sections that are configured to apply force to the user's foot that are adjacent oversized areas for clearance.

In the depicted embodiment, the fit of the boot is determined in part by the internal shape of the boot. In particular, the boot 10 of the embodiment shown in FIGS. 1-6 has no mechanisms (e.g., laces, buckles, straps, etc.) in the instep area 23 for tightening the boot onto the user's foot. In the depicted embodiment the boot also does not have mechanisms in the calf area 13 (above the instep area) for tightening the boot 10 over the user's leg. However, it should be appreciated that in alternative embodiments the boots can include various tightening mechanisms. For example, the boots according to the present disclosure can have tightening mechanisms configured to facilitate tucking the user's pant leg into the boot and tightening the boot over the user's pant leg (see FIGS. 7-10). It should be appreciated that boots according to alternative embodiments of the present disclosure could also have auxiliary mechanisms in the instep area for tightening and loosening the boot. In addition to the below the knee type boots shown in FIGS. 1-10, boots according to alternative embodiments can be above the knee boots such as waders and may include straps that connect to a waist belt or may includes straps that are configured to extend over a persons shoulders.

Referring to FIGS. 1-6, the boot 10 of the present disclosure is described in greater detail. Boot 10 includes an upper 12 connected to a sole 14. In the depicted embodiment the sole 14 is constructed of a rubber material. The upper 12 is also primarily constructed of a rubber material. In the depicted embodiment the upper 12 is primarily constructed of vulcanized rubber material over a neoprene (polychloroprene) material. The boot 10 includes a waterproof construction. In the depicted embodiment the vulcanized rubber material is molded over the neoprene material. It should be appreciated that boots according to the present disclosure can be constructed of many other types of materials and according to other construction methods (e.g., other rubber materials: styrene-butadiene rubber, synthetic rubber, blown rubber with or without stretch fabrics, or other elastic materials or elastic constructions (accordion leather), stretch gore, etc.).

The upper 12 includes a foot fitting portion 16 and a lower leg and ankle covering portion 18 connected above the foot fitting portion 16. The foot fitting portion includes a toe covering portion 20 at the toe end and a heel cup 22 at the heel end. The upper 12 includes an instep covering portion 24 that extends over the front side of the upper across the foot fitting portion 16 and the lower leg and ankle covering portion 18.

In the depicted embodiment, the upper includes a flexible zone 26 that extends along the back side of the upper directly above the heel cup 22.

Figure 4:
FIG. 4 is a cross-sectional view of the footwear of FIG. 1 showing a foot moving into the footwear.

In the depicted embodiment the flexible zone 26 of the boot 10 bulges outwardly when a user's heel presses against the flexible zone 26 during inserting and removal of a user's foot 30 from the boot 10 (see FIG. 4). Referring to FIG. 4, the solid line labeled 306 represents the inner surface of the boot and the broken line labeled 308 represents the silhouette of the user's foot and lower leg in an intermediate position in the boot (moving into or out of the boot). In the depicted embodiment the maximum deflection O of the flexible zone 26 is between 0.5 to 1.5 inch (e.g., 0.75 inches). Once the user's foot 30 is within the boot 10, the user's foot fits relatively snuggly within the boot 10 (see FIG. 5). In the depicted embodiment, the foot fitting volume of the foot fitting portion 16 of the boot 10 is only marginally larger than the volume of the foot that the boot 10 is designed to fit, as compared to traditional prior art loose fit slip-on boots (see FIG. 11).

In the depicted embodiment, the boot 10 is sized to fit a 9D (US) size foot. The overall height S of the boot 10 is between 11.0 to 13.0 inches, the length U of the boot 10 is between 11.5 to 12.5 inches, the maximum inner circumference T of the opening located at the top end of boot is between 15.0 to 17.0 inches, and the minimum inner circumference Q located at the transition between the foot fitting portion 16 and the lower leg and ankle covering portion 18 is between 12.0 to 13.5 inches. In the depicted embodiment the internal length D of the boot 10 is greater than 10.0 inches. It should be appreciated that the principles of the present disclosure are applicable to other boot sizes as well (e.g., the principles apply to boots of various sizes that are of the same model of the size 9D boot described therein).

Figure 1:
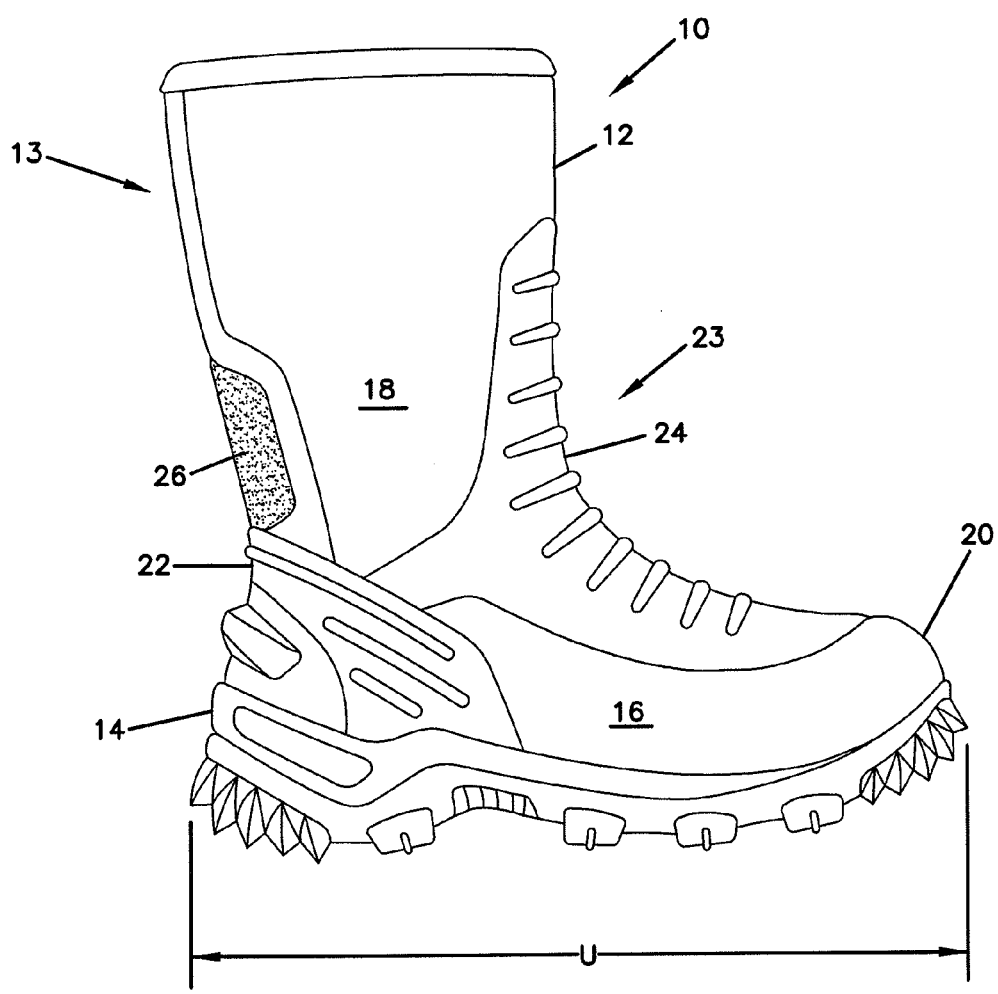
FIG. 1 is a side view of a footwear according to the principles of the present disclosure.
Figure 2:
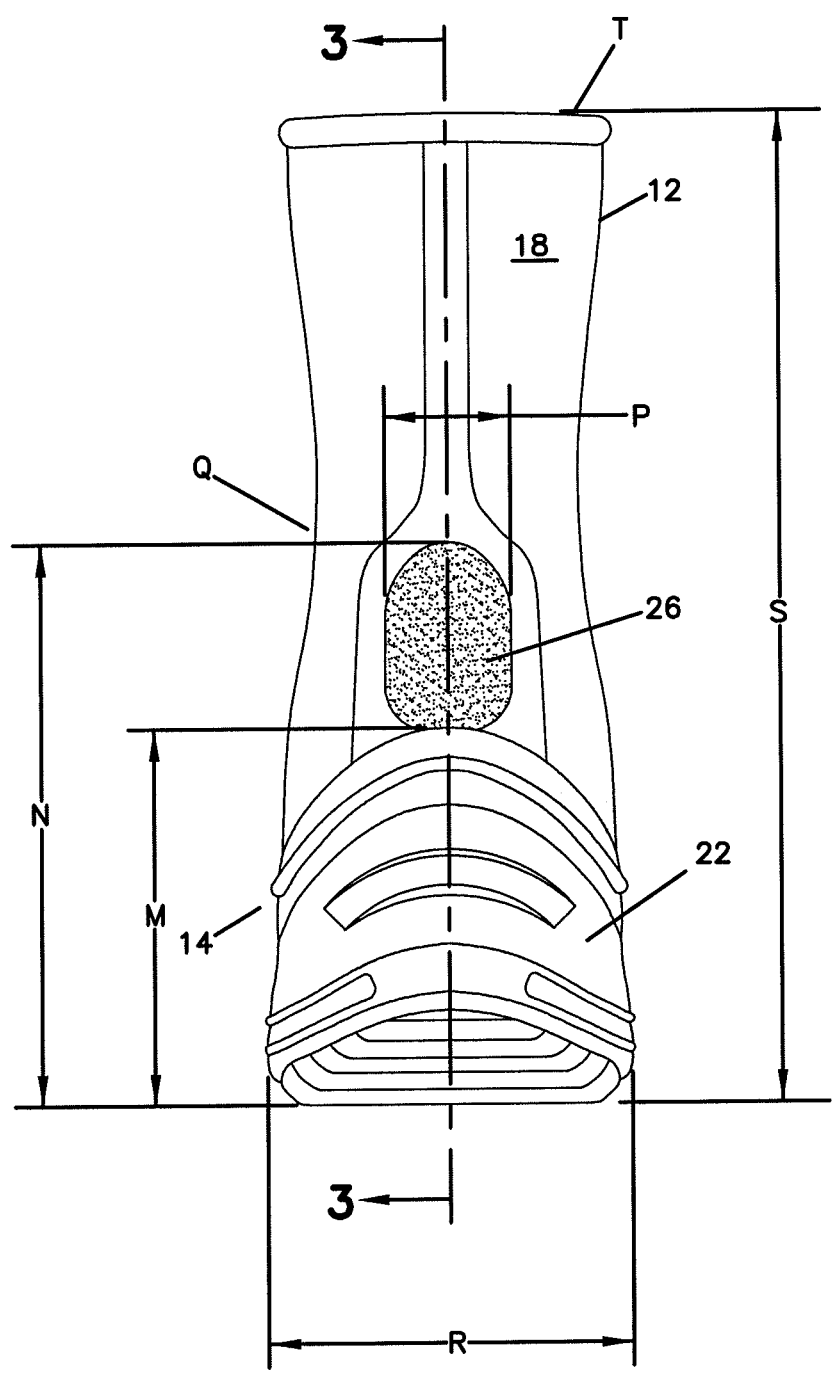
FIG. 2 is a back view of the footwear of FIG. 1.

Referring primarily to FIG. 2, in the depicted embodiment the width P of the flexible zone 26 is between 2.0 to 3.0 inches, the height N of the top of the flexible zone 26 is between 6.5 to 8 inches, and the height M of the bottom of the flexible zone 26 is between 4.0 to 6.0 inches. The area of the flexible zone is between 4.0 to 9.0 square inches. In the depicted embodiment the flexible zone 26 is an exposed portion of neoprene that is completely surrounded by vulcanized rubber covered neoprene.

Figure 3:
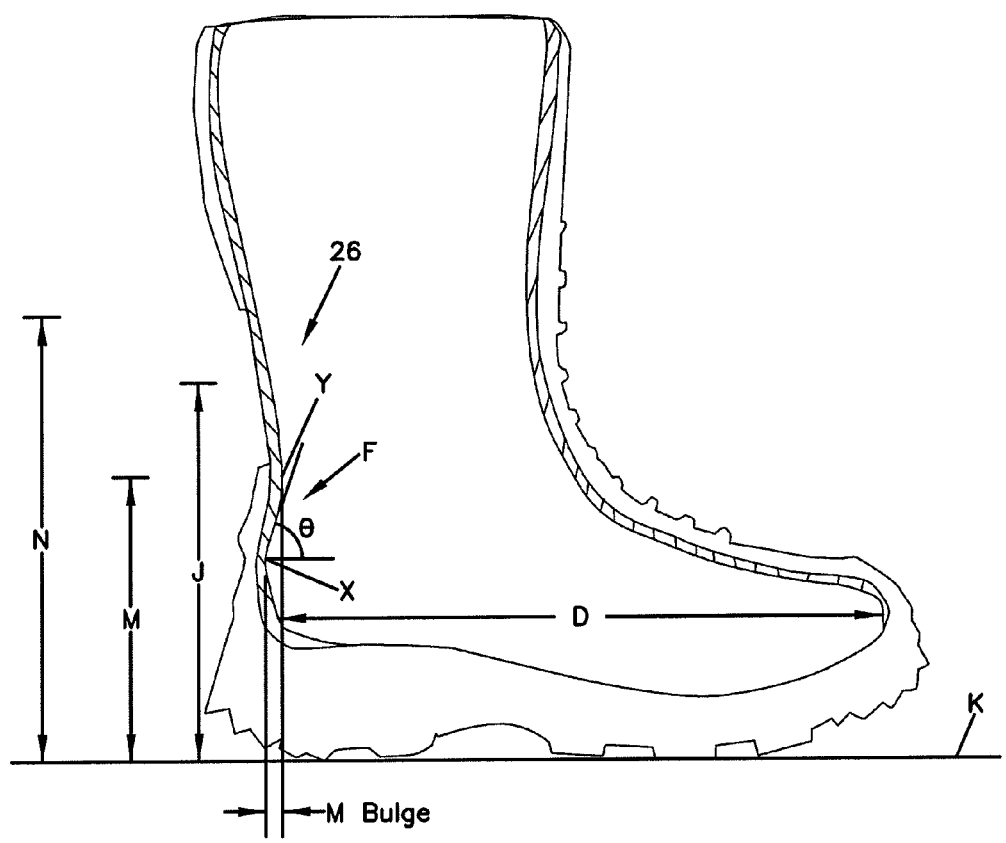
FIG. 3 is a cross-sectional view of the footwear of FIG. 1 along line 3-3 of FIG. 2.

Referring primarily to FIG. 3, in the depicted embodiment the curvature of the heel cup 22 is measured by the maximum bulge Mbulge and is between 0.5 to 1.5 inches. The maximum bulge Mbulge is the maximum distance between lines that are perpendicular to the ground plane K that are tangent to the rear most point X and forward most point Y of the heel curve F. In the depicted embodiment a portion of the heel curve F is inclined forward at an angle θ that is greater than 10.0 degrees.

Figure 6:
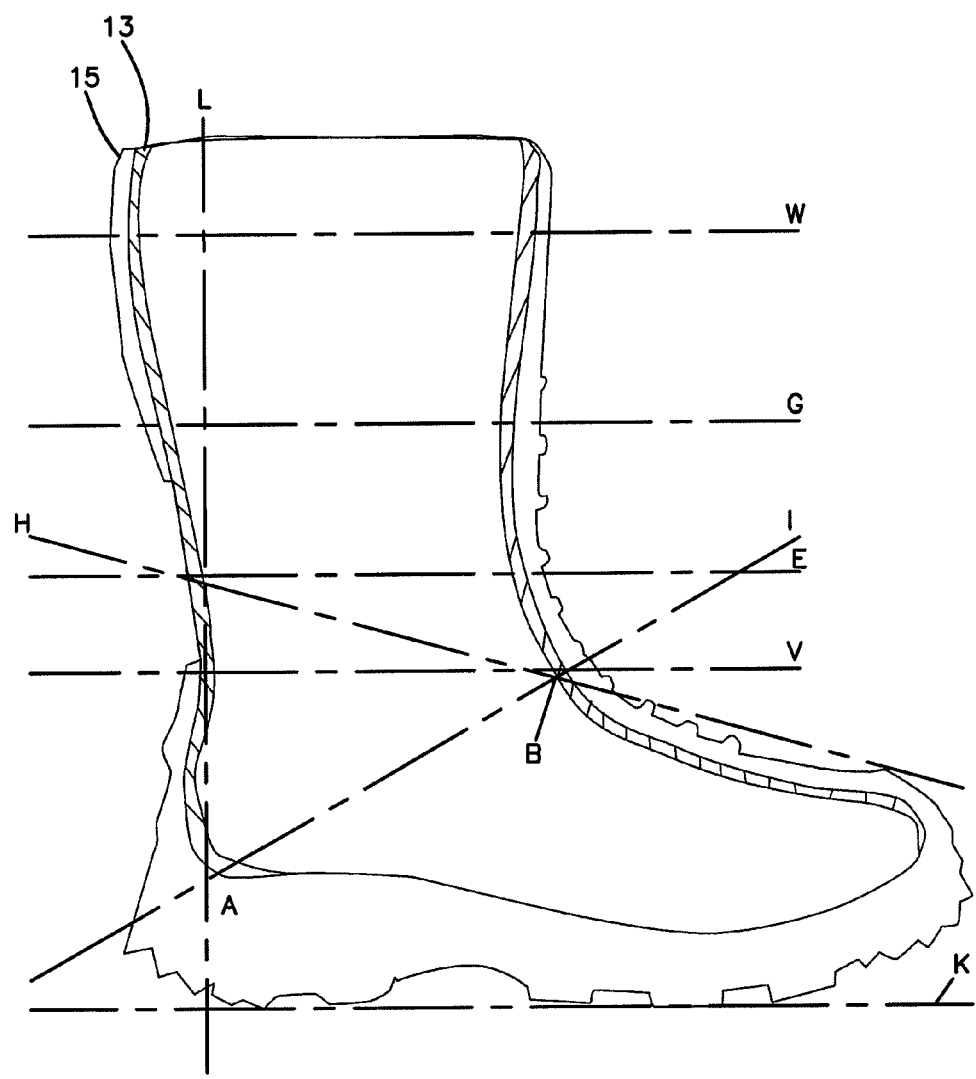
FIG. 6 is a cross-sectional view of the footwear of FIG. 1 along line 3-3 of FIG. 2.
Figure 7:
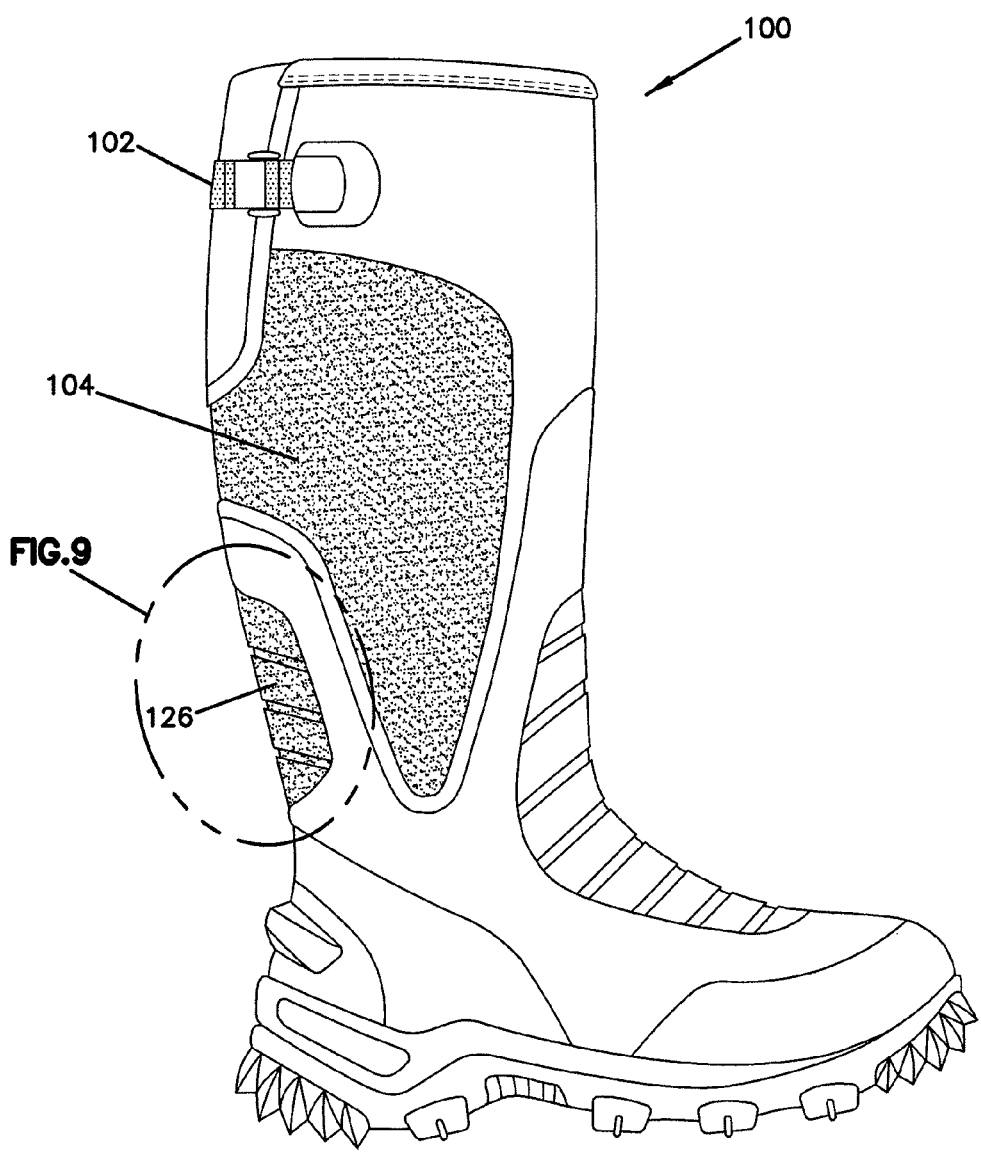
FIG. 7 is a side view of a footwear according to an alternative embodiment of the footwear of FIG. 1.
Figure 8:
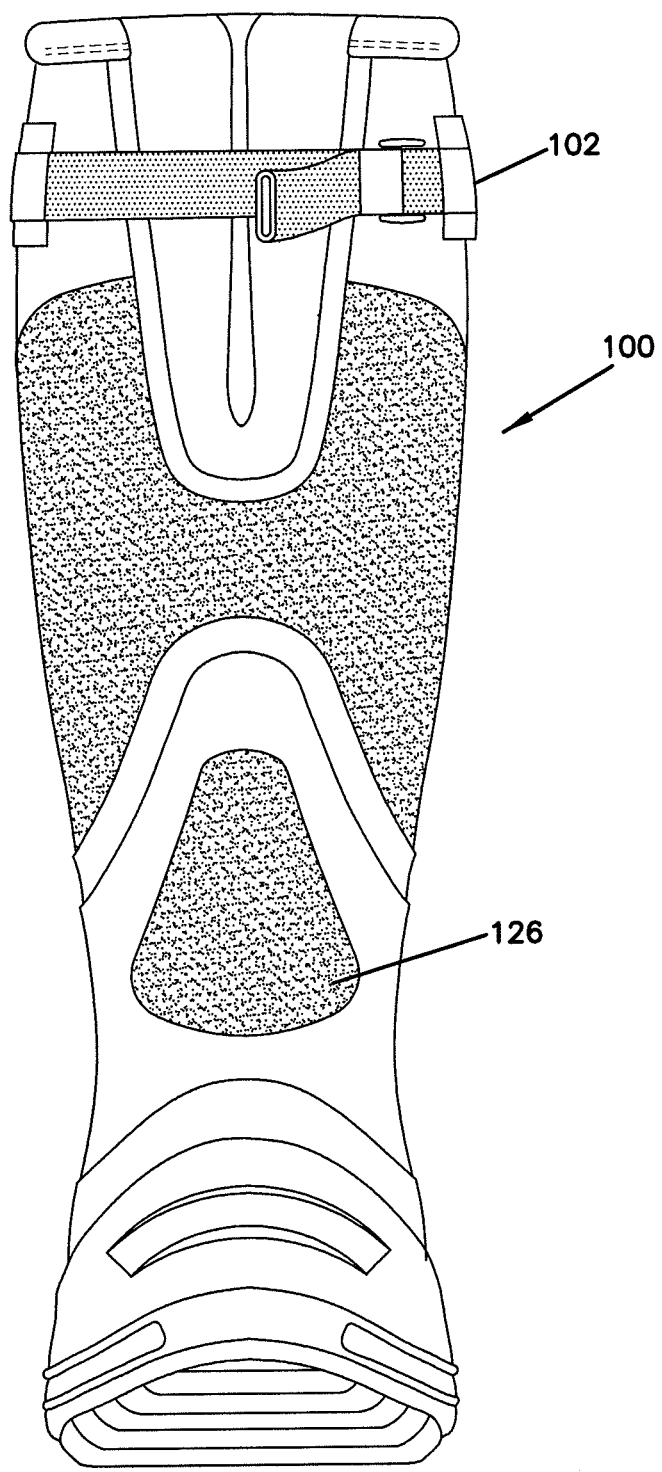
FIG. 8 is back view of the footwear of FIG. 7.
Figure 9:
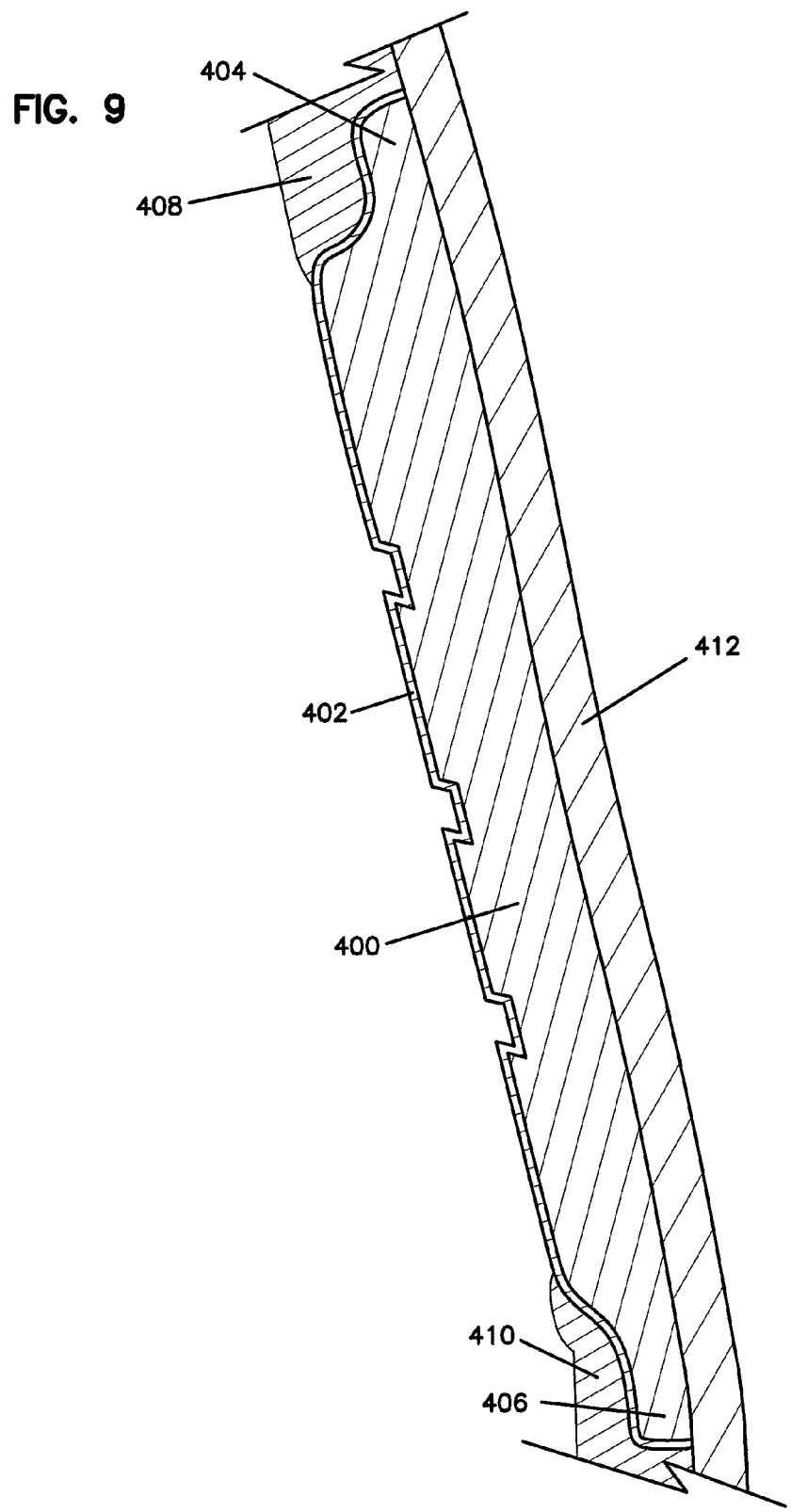
FIG. 9 is a cross-sectional view of a portion of FIG. 7.

Referring primarily to FIG. 6, the short heel girth AB as used herein refers to the dimension that passes through the heel point A and an instep point B. The heel point A as used herein is identified by the point upon which the girth dimension that passes through a point on the instep (e.g., point B) decreases as the point moves along the heel in either direction. The instep point B as used herein is defined by the point upon which the girth dimension that passes through a point on the heel (e.g., point A) increases as the point moves along the instep in either direction. The girth AB defines a plane referred to herein as plane I.

Planes E, G, V and W are defined herein to refer to planes that are parallel to the ground surface K, which the tread of the boot rests upon. See FIG. 6. Plane V passes through point B. Plane E is 5 inches from point A in a direction L, which is a vertical direction perpendicular to plane K. Plane G is the plane that is 7.0 inches from point A in a direction L that is perpendicular to plane K. Plane H is a plane that intersects planes E and I through point B. Plane W is the plane that is 10.0 inches from point A in a direction L that is perpendicular to plane K.

In the depicted embodiment the girth in: plane I is less than 15.2 inches (e.g., less than 15.0 inches, about 14.7 inches, etc.), plane V is less than 11.8 inches (e.g., about 11.3 inches), plane H is less than 12.5 inches (e.g., about 12.0 inches), plane E is less than 11.7 inches (e.g., about 11.2 inches), plane G is less than 13.3 inches (e.g., 12.8 inches), and plane W is between 14.6-15.6 inches (e.g., 15.1 inches). The above dimensions of the size 9D boot define a boot that has a relatively close fit. It should be appreciated that proportionally different dimensions would result for different size boots (e.g., smaller boots such as size 7 or larger boots such as size 13).

Figure 10:
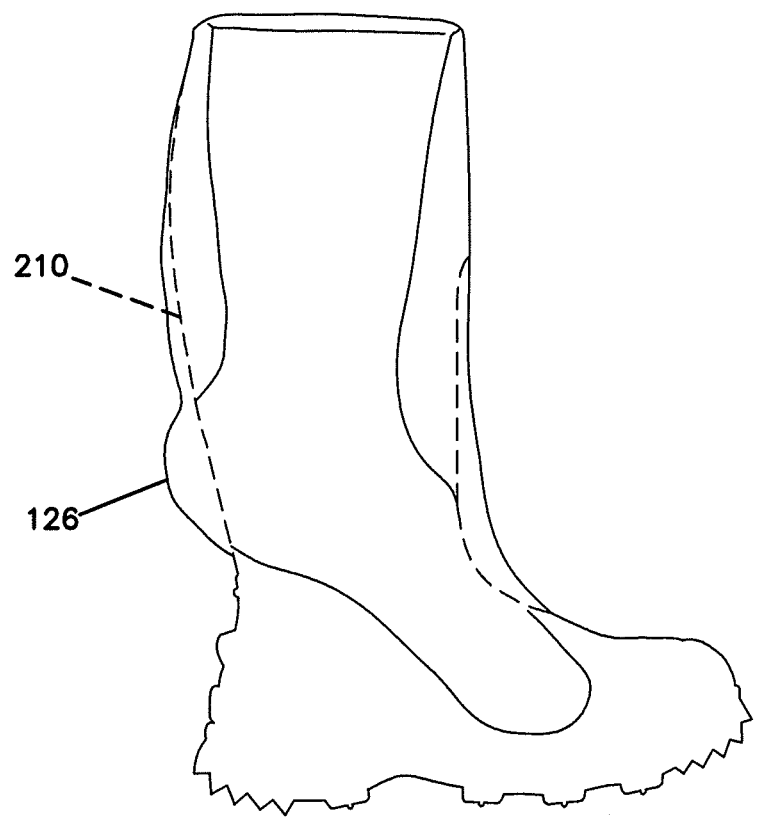
FIG. 10 is a cross-sectional view of the footwear of FIG. 7 showing a foot moving into the footwear.

Referring to FIGS. 7-10, an alternative embodiment of the boot 10 is shown. The boot 100 has similar features to the boot 10. One difference is that the boot 100 includes a fastening mechanism 102 at the top end of the boot. The fastening mechanism allows the upper end of the boot 100 to be easily enlarged to receive a user's pant leg and subsequently tightened over the user's pant leg. In addition to flexible zone 126, the side panels 104 of the boot 100 are also configured to deflect when the user's heel enters and exits the boot. The deflection of the boot 100 is illustrated in FIG. 10, wherein the dotted line 210 shows the boot in its undeflected state. In the depicted embodiment the flexible zone 126 comprises a polychloroprene material 412 covered by a flexible outer material. The flexible outer material is constructed of a low density molded blown rubber 400 (e.g., rubber having a density of less than 0.75 grams per cubic centimeters) cover by a four way stretch nylon material 402. In the depicted embodiment the edges of the flexible outer material 404, 406 extends under the vulcanized rubber periphery edges 408, 410 of the flexible zone 126. The flexible outer material provides improve durability and strength to the boot while still allowing the flexible zone 126 to flex as needed.

The present disclosure also provides a method of manufacturing the footwear. Referring to FIGS. 12-15, in the depicted embodiment, the footwear is constructed around a last 200. The last 200 is shaped to provide support to the footwear as it is constructed. In the depicted embodiment the last outer surface is configured to support substantially the entire inner surface of the footwear.

Figure 14:
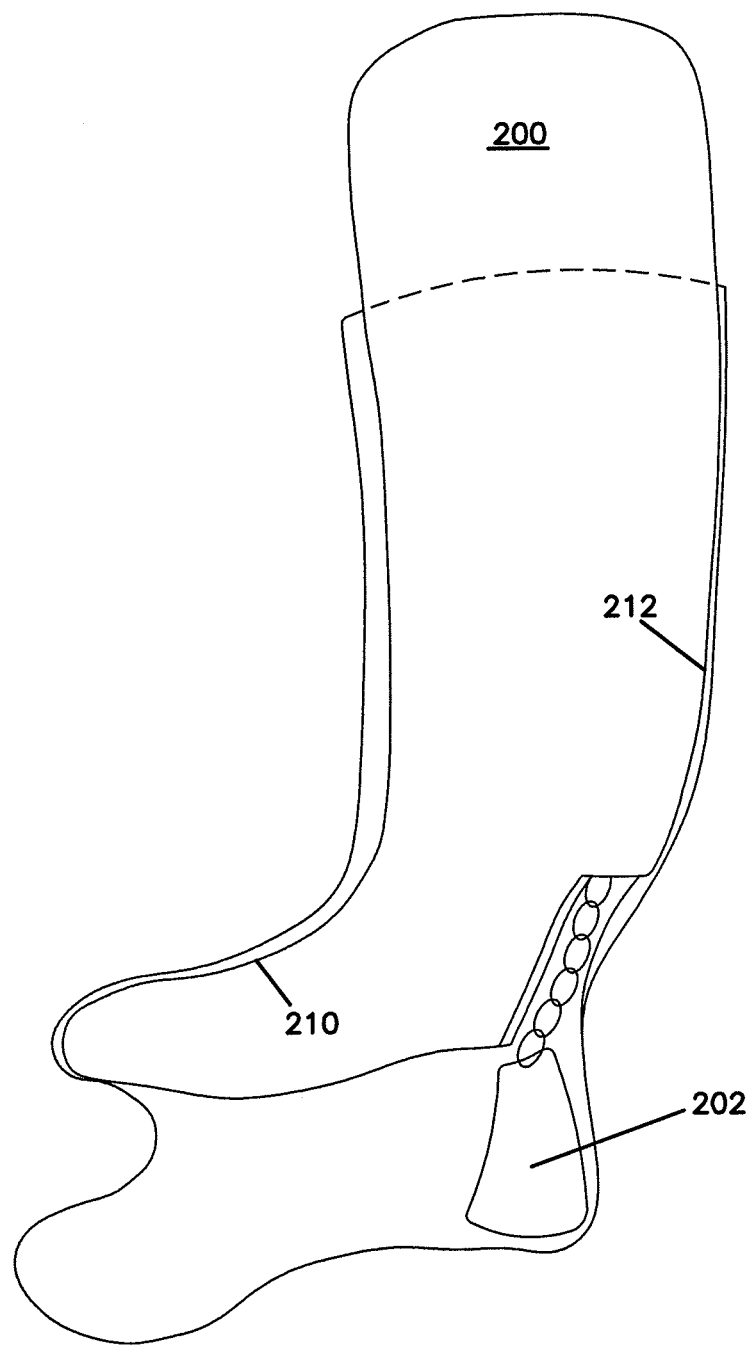
FIGS. 14 and 15 are side views of a footwear partially removed from the last of FIG. 12.
Figure 15:
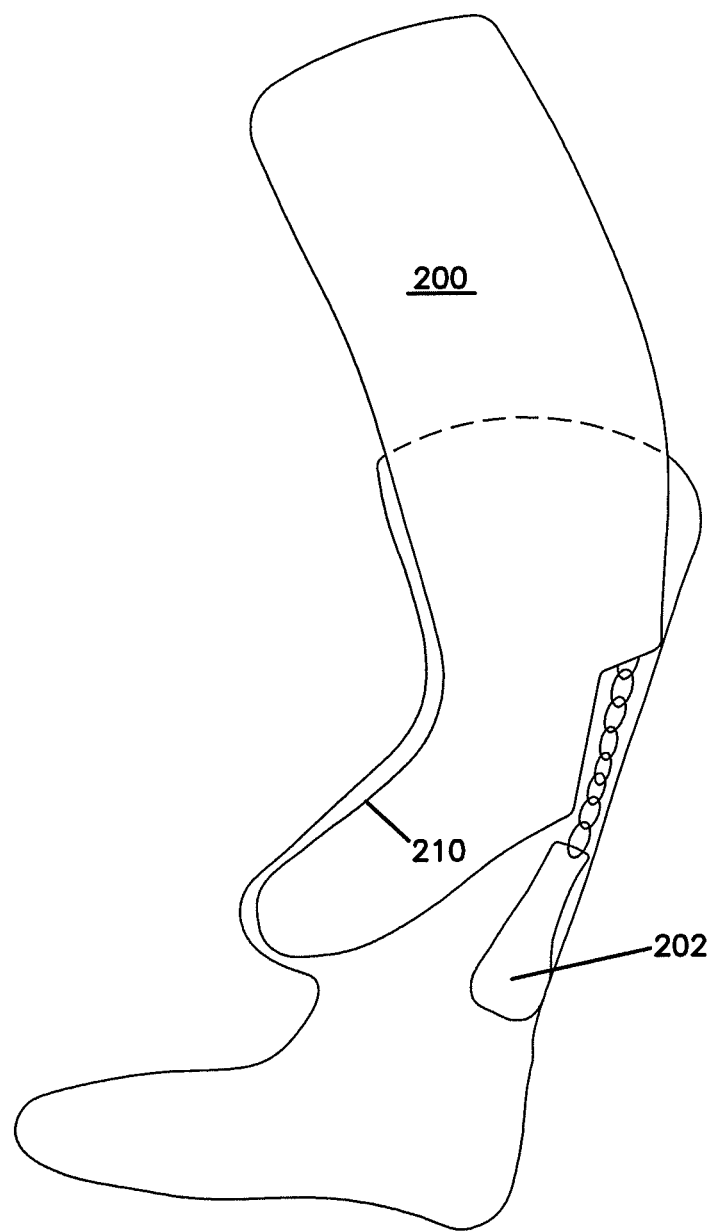
Figure 16:
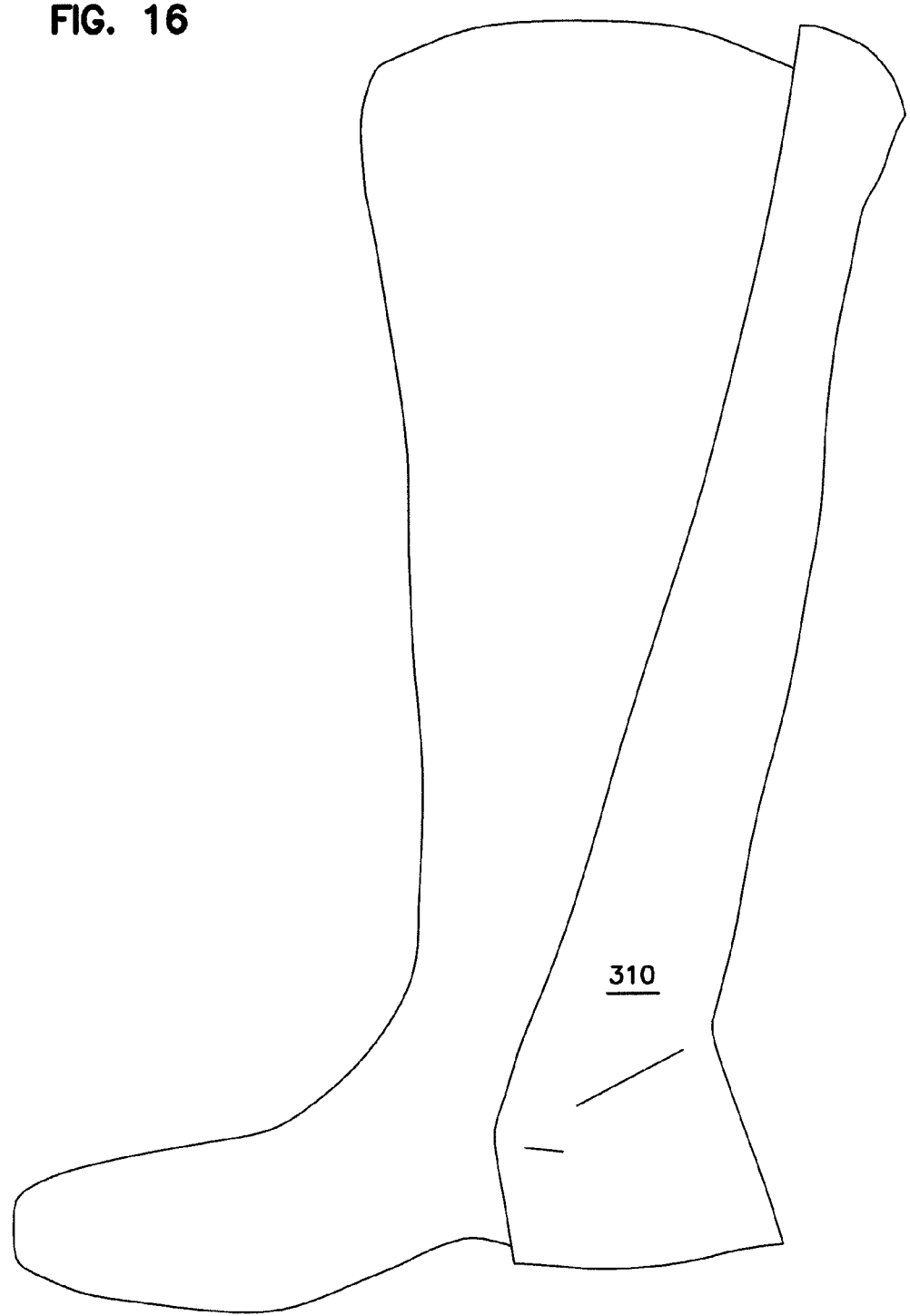
FIG. 16 is a side view of the last of FIG. 16 with a slip sheet.

Since the footwear of the depicted embodiment is configured to fit relatively snugly around a user's foot and does not include a lacing system that allows the internal shape or volume of the boot to be increased or substantially changed, removal of the footwear from a last can be difficult as it involves substantially deforming the footwear (see FIGS. 14 and 15). The effort required to remove the footwear from the last can depend on a number of factors including, for example, the shape of the footwear relative to the shape of the last and the frictional characteristics between the surface of the last and the inner surface of the footwear.

To facilitate removal of the footwear from the last, the last of the depicted embodiment can include last removal features. For example, the last 200 includes portions that move relative to other portions. For example, the heel portion 202 can be configured to slide away from the main body portion 204 of the last 200 to facilitate removal of the footwear from the last 200. In other embodiments, the last 200 can be configured such that other portions of the last move relative to the main body portion 204 of the last 200 (e.g., the forefoot portion 206 could be configured to pivot about point A and/or slide away from the main body portion 204 about line A-B).

In the depicted embodiment, removal of the footwear from the last can include the step of forcing air into the space between the last and the inside of the footwear. In one embodiment, the air is provided to outer surfaces of the last to blow off the inner surface of the footwear from the outer surfaces of the last, thereby preventing binding/sticking of the footwear to the last. The last can include a plurality of spaced apart air flow holes in some or all of the surfaces of the last. For example, air flow apertures could be provided on the outer surface of the last in the heel zone 208, the toe and instep zone 210, and/or the rear calf zone 212 to prevent binding of the footwear on the last in these areas. The locations of the air flow apertures can be arranged in areas where the footwear would otherwise catch or rub on the last as the footwear is removed from the last.

According to some embodiments, forced air (e.g., pressurized air) can be provided to the space between the inside surface of the footwear and the last to inflate at least a portion of the footwear. The inflating of the footwear deforms at least a portion of the footwear (i.e., expands a portion of the footwear), which can provide additional clearance between the footwear and the last as the footwear is removed from the last. In some embodiments, the air can be provided through the last itself via one or more air channels that are internal or external to the last. As discussed above, the air flow channels/apertures can be located in particular areas of the last. Alternatively, the air can be provided to a singular location in the last (e.g., the toe end 214 of the last). The air can be trapped between the last and the inner surface of the footwear by sealing the upper portion of the footwear against the upper portion of the last. The seal can be created by pressing the upper of the footwear against the last or by folding over the upper portion of the footwear to form a seal between the upper portion of the footwear and the last. While the footwear is inflated the footwear can be slid part way off the last.

In some embodiments, the forced air is provided at a high enough rate that sealing is not necessary to inflate the footwear. The air can be continuously forced into the space between the outer surface of the last and the inner surface of the footwear at a rate that is faster than that of the air escaping from the space, thereby causing at least a portion of the footwear to blow away from and/or inflate relative to the last. This configuration enables the operator to use both hands to pull the footwear free of the last. The flow can in some embodiments be controlled by a foot pedal. It should be appreciated that the various methods of removing the footwear from the last described above that involve forcing air into the last can be used together or separate from other methods of removing the footwear from the last.

According to some embodiments, slip sheets 310 can be provided between the inside surface of the footwear and the last to prevent binding of the inside surface of the footwear with the last. In the depicted embodiment, the slip sheet is provided on the rear surface of the last including the heel zone 208 and back of the calf zone 212 of the last. The slip sheet of the depicted embodiment is thin, low friction, heat resistant material (1/16" Teflon® sheet). It should be appreciated that many other slip sheet configurations are possible. As discuss above, it should be appreciated that these and other methods of facilitating the removal of the footwear from the last can be used alone or in combination with other methods.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method of manufacturing a boot comprising:
   constructing an upper having an outer shell; and
   providing a flexible zone along the back side of the upper above a heel cup of the upper
   wherein the step of constructing an upper includes building the upper around a last, wherein the portion of the last below the ankle area is configured so the heel cup and instep portions of the boot press inwardly and downwardly on the user's foot to secure the user's foot in the boot.

2. The method of claim 1, wherein the step of constructing an upper includes building the upper such that the foot that the boot is intended to fit cannot be inserted into the boot without deforming the boot.

3. The method of claim 1, wherein the flexible zone is configured to bulge outwardly by at least 0.5 inches.

4. The method of claim 1, wherein the upper includes a heel cup that has a bulge that is greater than 0.5 inches.

5. The method of claim 1, wherein the boot has an internal length of greater than 10.0 inches and a short heel girth that is less than 15.0 inches.

6. A method of claim 1, wherein the step of constructing an upper includes providing a last in the upper, wherein the last includes a heel portion that is configured to move relative to a main body portion.

7. A method of claim 1, wherein the step of constructing an upper includes providing a last in the upper, wherein the last is configured to force air out of an external surface in at least the heel zone, the toe zone, the instep zone, or the rear calf zone.

8. A method of claim 1, wherein the step of constructing an upper includes providing a last in the upper and providing a slip sheet between a portion of the upper and the last.

* * * * *